Sept. 18, 1962 A. HAZELTINE 3,054,561

COMPUTER FOR COLOR-FILM ANALYZER

Filed Jan. 8, 1959 2 Sheets-Sheet 1

United States Patent Office 3,054,561
Patented Sept. 18, 1962

3,054,561
COMPUTER FOR COLOR-FILM ANALYZER

Alan Hazeltine, Maplewood, N.J., assignor to Hazeltine Research, Inc., Chicago, Ill., a corporation of Illinois Filed Jan. 8, 1959, Ser. No. 785,751
2 Claims. (Cl. 235—184)

Figure 1:
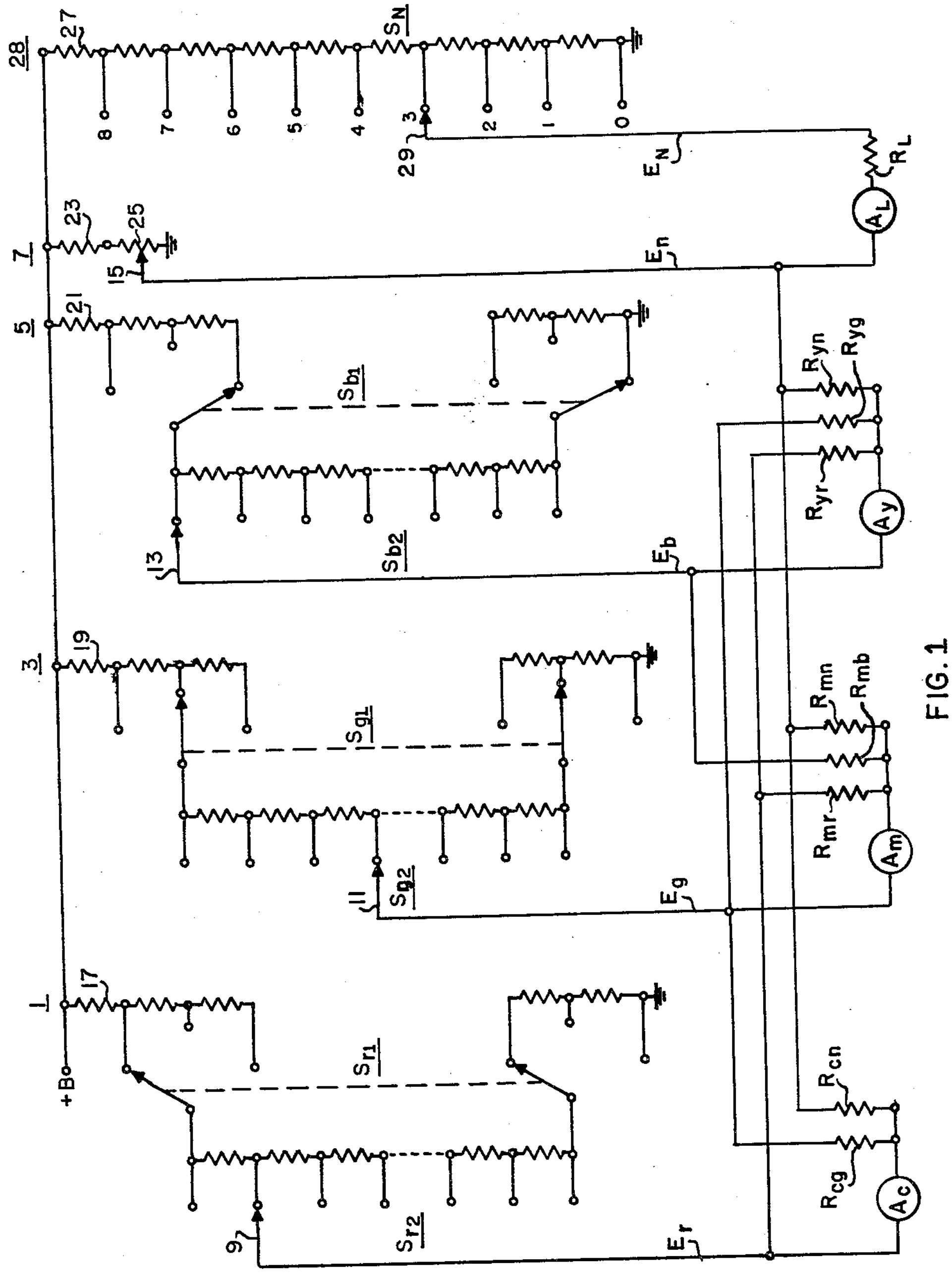

This invention pertains to computers for use in colorimetric processes, and particularly to a computer which determines the required densities of filters used in such processes so as to provide arbitrarily specified densities to respective ones of a set of complementary primary color components.

The general classification of colorimetric processes as being either additive or subtractive is well illustrated by the two corresponding types of photographic color printers. Both use a source of substantially white light. However, in an additive printer the white light is separated into individual beams of red, green, and blue primary color components which are respectively passed through individual filters. Each filter thus attenuates only one of the color components, such attenuation being determined by the density of that filter alone independently of the other filters. The emergent beams are then recombined to form the resultant printing light, which is used in preparing a positive color photograph from an original negative color photograph.

On the other hand, in a subtractive photographic printer the initial white source remains as a single integral beam, adjustment of the red, green, and blue primary color components thereof being effected by serially passing it through sets of color-correction filters of colors complementary to red, green, and blue. Each set thereby more or less selectively attenuates the one of those color components to which it is complementary, such attenuation being controlled by the optical density of the set. Thus, a set of cyan filters is employed to control the red color component, a set of magenta filters is employed to control the green color component, and a set of yellow filters is employed to control the blue color component. Actually, however, each color-correction filter attenuates portions of others of the primary color components besides that to which it is complementary. The true total density of all filter sets for each color component thus comprises the sum of different proportions of the nominal densities of all sets. This is explained in more detail in the copending application of Bernard D. Loughlin, entitled "Colorimetric Computer", Serial No. 774,989, now Patent No. 2,965,703 filed November 19, 1958, and assigned to applicant's assignee. It is shown therein that for a typical positive color film such as Eastman 5382, and when employing sets of cyan (C), magenta (M), and yellow (Y) Kodak color-correction filters together with a neutral filter of density $D_L$ to control printing light intensity, the actual red, green, and blue densities $D_r$, $D_g$, and $D_b$ are given by the following equations:

$$\begin{aligned} D_r &= 0.88C + 0.03M + D_n \\ D_g &= 0.18C + 0.85M + 0.05Y + D_n \\ D_b &= 0.09C + 0.15M + 0.92Y + D_n \end{aligned} \qquad (1)$$

The values of C, M, and Y here represent the total rated densities of the respective filter sets, while $D_n$ represents the total neutral density produced by the neutral filter of density $D_L$ plus the inherent neutral density of a total number "N" of color-correction filters in all of the filter sets together. That is, $$D_n = D_L + 0.04N \qquad (2)$$

Equations 1 may be solved to derive the required color-correction filter densities C, M, and Y for providing specified densities $D_r$, $D_g$, and $D_b$ to the respective red, green, and blue color components, giving:

$$\begin{aligned} C &= 1.14D_r - 0.04D_g - 1.10D_n \\ M &= -0.24D_r + 1.20D_g - 0.07D_b - 0.89D_n \\ Y &= -0.07D_r - 0.18D_g + 1.10D_b - 0.85D_n \end{aligned} \qquad (3)$$

Equations 3 show that each required density is equal to a given multiple of the specified density for the complementary color component reduced by the sum of given multiples of the specified densities for the remaining color components and a given multiple of the total neutral density. Those equations are of particular significance when it is desired to control a subtractive photographic printer in accordance with data supplied by an electronic color film previewer such as that disclosed in the copending application of W. F. Bailey, B. D. Loughlin, and C. E. Page for "Electronic Previewer for Negative Color Film," Serial No. 662,199, now Patent No. 2,976,348, filed May 28, 1957, and which is also assigned to applicant's assignee. The particular type of previewer described in detail therein is most directly suited to determining the proper density values $D_r$, $D_g$, and $D_b$ of filters in an additive photographic printer. Consequently, it is necessary to substitute these specified densities in Equations 3 in order to determine the required color-correction filter densities applicable to a subtractive photographic printer. The novel computer disclosed in the above-mentioned copending application Serial No. 774,989, now Patent No. 2,965,703, performs this computation by means of an electrical network wherein substantially constant voltages are applied to a plurality of resistive branches, each branch being proportioned in fixed degree in accordance with the constant coefficients in Equations 3 and being adapted to be further variably proportioned in accordance with the particular specified density values. The net currents in the respective branches are then proportional to the required C, M, and Y densities. An auxiliary branch of the same type is also provided for solving Equation 2 for the requisite neutral filter density $D_L$. Such a computer is theoretically capable of extremely high accuracy. However, in actual practice it is difficult to obtain resistors of sufficiently accurate rated resistance to take full advantage of such potential accuracy. Also, since photographic printers are normally controlled by means of fixed filters which can only provide discrete increments of density variation, an accuracy beyond the smallest such increment is unnecessary in most cases. Applicant has found that a considerably simpler electrical computer of more than adequate accuracy for determining required standard filter densities may be achieved by means of a different type of network employing fixed resistances, any arbitrarily specified density values being simulated by adjusting the voltages applied thereto.

Applicant is further concerned with the problem that even after the requisite C, M, Y, and $D_L$ densities are determined, it is still necessary to select combinations of filters for providing each of those values. That is, standard color-correction filters are available in rated densities of 0.025, 0.05, 0.10, 0.20, 0.30, 0.40, and 0.50. A variety of combinations of those values could thus be used to provide a total nominal density as close as possible to a desired value within the accuracy established by the smallest available increment of 0.025. The operator is therefore required to take the time to calculate the best filter combination, usually the one requiring the least number of filters, which should be used.

Accordingly, an object of the invention is to provide for use in a subtractive colorimetric process a computer capable of determining the required densities of sets of color-correction filters having colors respectively complementary to respective ones of a set of primary color components for which said filters are together required to provide respective arbitrarily specified densities.

A further object is to provide such a computer which also determines the required neutral filter density to be employed with the foregoing required color-correction filter densities in order to minimize the total number of color-correction filters which are required.

A further object is to provide a scale for a measuring instrument which displaces its indicating index in accordance with the required total density of a set of filters, such scale being calibrated so as to display the rated densities of the least number of individual filters having a total density as close as possible to that required.

In accordance with the foregoing objects, the invention is directed to providing a computer for use in a subtractive colorimetric process, such computer being capable of determining the required densities of a neutral filter and sets of color-correction filters having colors respectively complementary to respective ones of a set of primary color components for which the above-mentioned filters are together required to provide respective arbitrarily specified densities. The computer operates in accordance with the equations of the general form of Equations 3 above, wherein each required density is equal to a given multiple of the specified density for the complementary color component reduced by the sum of given multiples of the specified densities for the remaining color components and a given multiple of a selectable total neutral density, the selectable total neutral density being equal to the sum of the neutral filter density plus a given multiple of the total number of color-correction filters in all of the above sets. One embodiment of such a computer comprises a plurality of means for providing voltages respectively adjustable in proportion to respective ones of the specified densities, and additional means for providing an auxiliary adjustable voltage to which the selectable total neutral density is proportional. The computer further comprises a plurality of principal current-responsive indicating means for respectively displaying the required color-correction filter densities, each such principal indicating means having a pair of terminals of which one is connected to the voltage-adjusting means for the specified density for the color component complementary to the required density to be displayed. The computer also comprises a plurality of resistive elements for respectively connecting the remaining terminal of each indicating means to the remaining ones of the voltage-adjusting means, each such element having a resistance inversely proportional to the one of the given multiples which is applicable to the relation between the density represented by the voltage-adjusting means to which it is connected and the required density to be indicated by the indicating means to which it is further connected. Finally, it comprises auxiliary current-responsive indicating means for displaying the required neutral filter density, the auxiliary indicating means also having a pair of terminals, of which one is connected to the auxiliary voltage-adjusting means, and means for applying to the remaining terminal of the auxiliary indicating means a voltage which is variable in steps proportional to the total number of color-correction filters in all of the sets. The current through the auxiliary indicating means is proportional to the required neutral filter density and the current through each of the principal indicating means of the computer is proportional to the required color-correction filter density to be displayed thereby.

Another aspect of the invention is directed to the indicating means of the computer, each of which may be an instrument which displaces its index in accordance with the total optical density to be provided by a set of optical filters having rated densities which are binary submultiples and successive integral multiples of a reference density. This refers to the previously mentioned rated filter densities 0.025, 0.05, 0.10, 0.20, 0.30, 0.40, and 0.50; the first two of these being the binary submultiples ¼ and ½ of a reference density 0.10, and the remaining rated densities being successive integral multiples thereof. A novel scale is provided relative to which the index displacement is measured, such scale comprising a set of coextensive parallel strips of which a principal strip indicates the integral multiple densities, and the remaining subsidiary strips indicate respective ones of the submultiple densities. Each strip starts at a negative displacement of the index corresponding to a total density equal to one-half of the smallest submultiple density, and each has a plurality of equal divisions. The divisions of each subsidiary strip have widths proportional to the submultiple density indicated thereby, successive divisions being marked alternately inactive and active starting with an inactive division. The divisions of the principal strip each have a width proportional to the foregoing reference density, and successive ones thereof after the first division are marked with successive ones of the multiple densities. The first division indicates zero density.

In case the maximum available filter rating extends only up to a maximum integral multiple of the reference density, which does not cover the entire range of measurement, the foregoing markings of the divisions of the principal strip only go as far as such maximum integral multiple, subsequent divisions repeating the marking thereof. In addition, a second principal strip is provided extending from the end of the foregoing maximum integral multiple density division of the first principal strip and having divisions of the same width as those of the first principal strip. Successive divisions of the second principal strip are marked with successive ones of the above-defined multiple densities.

Thus, the active divisions of the subsidiary strips and the markings of the divisions of the principal strips at any given displacement of the index of the measuring instrument will indicate directly the least number of individual rated filter densities having a sum as close as possible to the total density corresponding to such displacement.

For a better understanding of the present invention, together with other and further objects thereof, reference is had to the following description, taken in connection with the accompanying drawings, and its scope will be pointed out in the appended claims.

Figure 2:
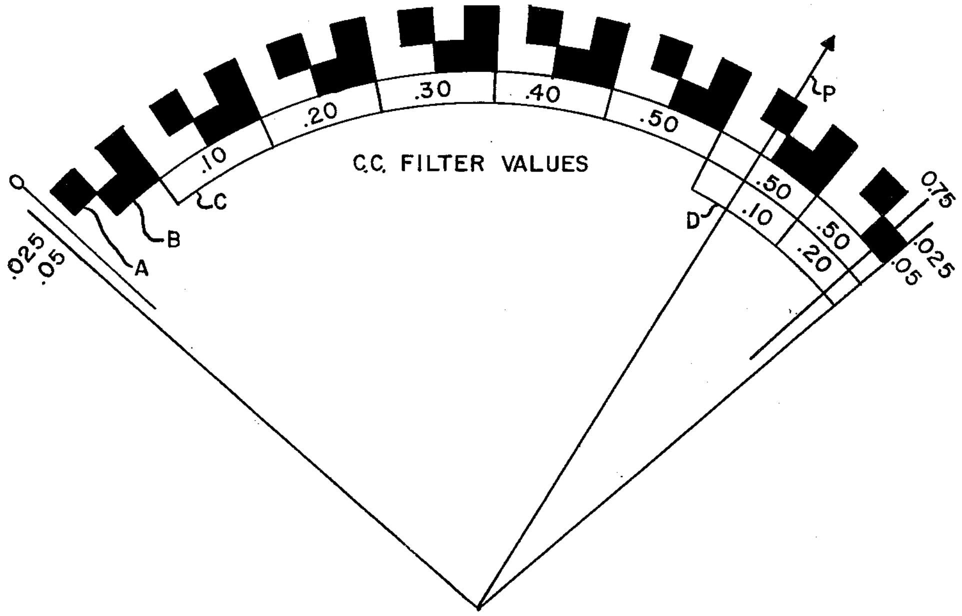
Figure 3:
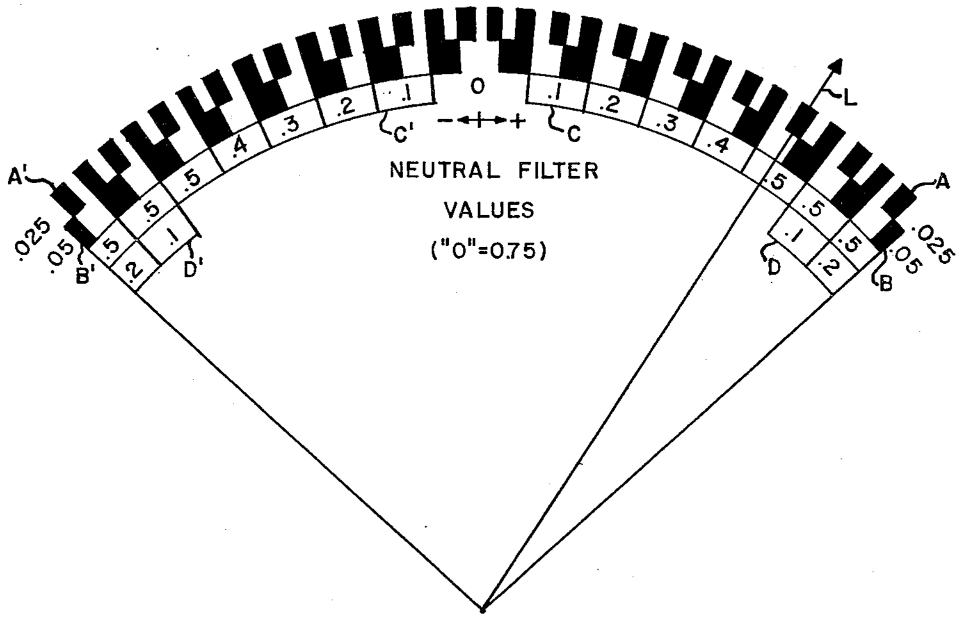

Referring to the drawings:

FIG. 1 is a circuit diagram of a computer constructed in accordance with the invention, and FIGS. 2 and 3 respectively show indicating instrument scales arranged in accordance with the invention.

Referring now to Equations 3 above, these can be written in the more general form:

$$\begin{aligned} C&=m_{cr}D_r-m_{cg}D_g-m_{cb}D_b-m_{cn}D_n \\ M&=-m_{mr}D_r+m_{mg}D_g-m_{mb}D_b-m_{mn}D_n \\ Y&=-m_{yr}D_r-m_{yg}D_g+m_{yb}D_b-m_{yn}D_n \end{aligned} \qquad (3a)$$

Here the $m$'s may have the values given in Equations 3 or other values suited to other filter characteristics or to other film stock. In each of Equations 3a the algebraic sum of the coefficients is 0, as may be proved by taking $C=M=Y=0$ in Equations 1, which then reduce to $D_n=D_r=D_g=D_b$. Substituting these relations in Equations 3a gives:

$$\begin{aligned} 0&=m_{cr}-m_{cg}-m_{cb}-m_{cn} \\ 0&=-m_{mr}+m_{mg}-m_{mb}-m_{mn} \\ 0&=-m_{yr}-m_{yg}+m_{yb}-m_{yn} \end{aligned} \qquad (3b)$$

As stated above, sets of standard C, M, and Y filters are available in rated densities of 0.025, 0.05, and then in steps of 0.10 up to 0.50. Thus, values of C, M, or Y in steps of 0.025 up to 1.05 can be obtained by combining not over four different filters (for example 1.05=0.50+0.40+0.10+0.05). To minimize the total number N of filters required, the value of $D_n$ (which is otherwise arbitrary) should be taken so that in Equations 3a at least one of the values C, M, or Y becomes 0 and none is negative. With N thus determined, the required neutral filter density $D_L$ is found from Equation 2:

$$D_L = D_n - 0.04N \quad (4)$$

*Computer Circuit Construction*

In accordance with the foregoing relations, the novel computer circuit in FIG. 1 comprises a plurality of means for providing voltages which are respectively adjustable in proportion to any arbitrarily specified values of red, green, and blue density. Specifically, such means include voltage-dividers 1, 3, and 5, each connected across a source of substantially constant direct voltage B+ with respect to ground, and each adjustable to provide output voltages at their taps 9, 11, and 13, respectively, proportional to specified $D_r$, $D_g$, and $D_b$ values. Auxiliary means such as voltage-divider 7 may be further connected across the direct voltage supply to provide a voltage which is adjustable in proportion to a total neutral density value $D_n$. Finally, means such as voltage-divider 28 is also connected across the direct voltage supply to provide a voltage which is adjustable in proportion to the total number N of required color-correction filters.

Voltage-dividers 1, 3, and 5 may preferably be constructed so as to facilitate control thereof by the color control attenuators of an electronic previewer such as that disclosed in copending application Serial No. 622,199, now Patent No. 2,976,348, identified above. Those attenuators will usually be calibrated in terms of optical densities. The red attenuator, for example, may typically include a three-position switch providing two principal steps of 0.425 each in red density. Voltage-divider 1 may therefore include three-position step switch $S_{r1}$ which can be mechanically ganged with the previewer switch to provide two proportionate principal steps of voltage division. The red attenuator of the previewer may also typically include a fine adjustment switch capable of providing a density range of 0.65 in 26 steps of 0.025 each. For ganged operation therewith, voltage-divider 1 may further include a step switch $S_{r2}$ having 26 steps in series with the terminals of switch $S_{r1}$, output tap 9 of the complete voltage-divider being adjustable to any of the latter steps. The total range $D_0$ in red density which may be specified by a previewer attenuator as described is $$D_0 = 0.425 + 0.425 + 0.65 = 1.50$$

To achieve a proportionate voltage range at tap 9 the resistance values of the steps of switches $S_{r1}$ and $S_{r2}$ should be chosen proportional to the corresponding density steps of the principal and fine adjustment switches of the previewer attenuator, such typical resistance values being 3.06 and 0.18 kilohms, respectively. A constant proportion will then exist between the resistance $R_r$ between output tap 9 and ground relative to the corresponding value of $D_r$ at any tap position. This proportion will also apply to the ratio of the maximum value of $R_r$ to the maximum value of $D_r$, which was given above as $D_0 = 1.50$. The maximum value of $R_r$, using the specific resistance values given above, will therefore be $$2 \times 3.06 + 26 \times 0.18 = 10.8 \text{ kilohms}$$

The applicable proportion is then:

$$\frac{R_r}{D_r} = \frac{0.18}{0.025} = \frac{3.06}{0.425} = \frac{10.8}{1.50}$$

Voltage-dividers 3 and 5 may each be constructed the same as voltage-divider 1. In that case, which is illustrated in FIG. 1, voltage-divider 3 will comprise step switches $S_{g1}$ and $S_{g2}$ and voltage-divider 5 will comprise step switches $S_{b1}$ and $S_{b2}$, respectively identical with step switches $S_{r1}$ and $S_{r2}$ described above. In addition, in the interest of improved accuracy, as will be described in more detail hereinafter, voltage-dividers 1, 3, and 5 respectively include fixed resistors 17, 19, and 21 in series with the adjustable portions thereof. A suitable specific resistance value for each of these fixed resistors is 2.2 kilohms.

In the absence of appreciable currents drawn off at the output taps 9, 11, and 13, a supply voltage B+ of 150 volts will produce a voltage $E_0$ across each of switches $S_{r1}$, $S_{g1}$, and $S_{b1}$, as follows:

$$E_0 = 150 \frac{10.8}{10.8 + 2.2} = 124.6 \text{ volts}$$

The ratio of voltage $E_0$ to the maximum density range $D_0$ will then also equal the ratio of the voltages $E_r$, $E_g$, and $E_b$ at output taps 9, 11, and 13 to the respective densities $D_r$, $D_g$, and $D_b$. That is, assuming that $D_0$ is 1.50, $$\frac{124.6}{1.50} = \frac{E_0}{D_0} = \frac{E_r}{D_r} = \frac{E_g}{D_g} = \frac{E_b}{D_b} \quad (5)$$

The auxiliary voltage-divider 7 is not ganged with the attenuator controls of the electronic previewer, as may be true of voltage-dividers 1, 3, and 5 as described above. Instead, voltage-divider 7 is manipulated independently in using the computer. It may conveniently comprise a fixed resistor 23 in series with a continuously variable potentiometer 25 which need not be calibrated. The adjustable voltage $E_n$ at output tap 15 of potentiometer 25 defines an arbitrarily selectable total neutral density $D_n$ in accordance with an equation of the same form as Equations 4 and 5 above, namely, $$\frac{124.6}{1.50} = \frac{E_0}{D_0} = \frac{E_n}{D_n} \quad (6)$$

It should be noted that the voltage $E_n$ is the actual voltage at tap 15, regardless of the fact that appreciable current may be drawn therefrom.

The additional voltage-divider 28 in FIG. 1 includes a fixed resistor 27 in series with a step switch $S_N$ having a tap 29 which may be set to include a number of steps equal to the total number N of required color-correction filters. Such numbers N are indicated by the step-setting numerals 0–8, more than eight color-correction filters normally being unnecessary. Resistor 27 and the resistance between each of the successive steps of switch $S_N$ are chosen so that the voltage $E_N$ at tap 29 corresponds to the term 0.04N in Equation 4 above by the same proportion as that in Equation 5. Specifically, the resistance of resistor 27 may be 10 kilohms, and the resistance between each pair of steps of switch $S_N$ may be 0.27 kilohms. With these values, $$E_N = 150 \frac{0.27N}{10 + 8 \times 0.27} = 3.33N = 0.04N \frac{E_0}{D_0} \quad (6a)$$

This voltage $E_N$ is the voltage at tap 29 in the absence of appreciable current drawn therefrom.

The circuit of FIG. 1 further comprises a plurality of current-responsive indicating means for respectively indicating the required C, M, Y, and $D_L$ densities. Specifically, these are milliammeters $A_c$, $A_m$, $A_y$, and $A_L$. The indicating means for the required C, M, and Y densities each have a pair of input terminals of which one is connected to the voltage-adjusting means for the specified density for the color complementary to that of the required density to be displayed. Thus, one input terminal of each of milliammeters $A_c$, $A_m$, and $A_y$ is connected, respectively, to output taps 9, 11, and 13 of voltage-dividers 1, 3, and 5 corresponding to the red, green, and blue specified density values. The indicating means for the required neutral density, namely, milliammeter $A_L$, also has a pair of terminals of which one is connected to the voltage-adjusting means for the total neutral density. Specifically, one terminal of that milliammeter is connected to output tap 15 of voltage-divider 7.

The circuit of FIG. 1 also includes a plurality of resistive elements for respectively connecting the other input terminal of each of the indicating means $A_c$, $A_m$, and $A_y$ to the remaining ones of the principal voltage-adjusting means and to the auxiliary voltage-dividing means. Thus, milliammeter $A_m$ is connected by resistors $R_{mr}$, $R_{mb}$, and $R_{mn}$ to the output taps of voltage-dividers 1, 5, and 7; milliammeter $A_y$ is connected by resistors $R_{yr}$, $R_{yg}$, and $R_{yn}$ to the output taps of voltage-dividers 1, 3, and 7; and milliammeter $A_c$ is connected by resistors $R_{cg}$ and $R_{cn}$ to the output taps of voltage-dividers 3 and 7. While no actual connection is made from milliammeter $A_c$ to voltage-divider 5 for blue density, this is only because the actual value of the constant multiple $m_{cb}$ in Equations 3*a* is zero, as shown in Equations 3. In fact, it may be considered that such a connection exists, but that its resistance $R_{cb}$ is infinite. The ensuing description of the circuit of FIG. 1 will make this clearer.

Each of the resistors connected to milliammeters $A_c$, $A_m$, and $A_y$ is proportioned in accordance with the one of the given "*m*" multiples in Equations 3*a* above applicable to the relation between the specified density corresponding to the voltage-adjusting means to which such resistor is connected and to the required density to be displayed by the milliammeter to which it is further connected. That is, resistance $R_{cg}$ is determined by the given value of $m_{cg}$, the resistance of resistor $R_{cn}$ is determined by the given value of $m_{cn}$, etc. The precise relations are as follows, using the required M filter density to illustrate the calculation involved. Assuming that each of resistors $R_{mr}$, $R_{mb}$, and $R_{mn}$ connected to milliammeter $A_m$ has a much larger resistance than any of the milliammeters or any of the voltage-dividers, the current $I_m$ through milliammeter $A_m$ will be:

$$I_m = G_{mr}(E_g - E_r) + G_{mb}(E_g - E_b) + G_{mn}(E_g - E_n) = G_{mg}E_g - G_{mr}E_r - G_{mb}E_b - G_{mn}E_n \quad (7)$$

where $G_{mr}$, $G_{mb}$, and $G_{mn}$ are the reciprocals of the corresponding resistances and where $$G_{mg} = G_{mr} + G_{mb} + G_{mn} \quad (8)$$

Now $G_{mr}$, $G_{mb}$, and $G_{mn}$ are chosen proportional to the corresponding *m*'s in the second of Equations 3*a*. So, by the second of Equations 3*b*, the same proportion will hold for $G_{mg}$ relative to $m_{mg}$. That is:

$$\frac{G_{mr}}{m_{mr}} = \frac{G_{mb}}{m_{mb}} = \frac{G_{mn}}{m_{mn}} = \frac{G_{mg}}{m_{mg}} \quad (9)$$

Substituting Equations 5, 6, and 9 into Equation 7 gives $$I_m = \frac{G_{mg}}{m_{mg}} \cdot \frac{E_0}{D_0}(m_{mg}D_g - m_{mr}D_r - m_{mb}D_b - m_{mn}D_n)$$

Since the parenthetical factor is the same as the value of M as given by the second of Equations 3*a*, it follows that $$I_m = \frac{G_{mg}}{m_{mg}} \cdot \frac{E_0}{D_0} M \quad (10)$$

If the full-scale current of each of milliammeters $A_c$, $A_m$, and $A_y$ is $I_S$, Equation 10 shows that $I_S$ will represent a density $D_S$ in accordance with the relation $$I_S = \frac{G_{mg}}{m_{mg}} \cdot \frac{E_0}{D_0} D_S \quad (11)$$

Thus, by Equations 9 and 11, $$\frac{E_0}{D_0} \cdot \frac{D_S}{I_S} = \frac{m_{mg}}{G_{mg}} = \frac{m_{mr}}{G_{mr}} = \frac{m_{mb}}{G_{mb}} = \frac{m_{mn}}{G_{mn}} \quad (12)$$

The values of $R_{mr}$, $R_{mb}$, and $R_{mn}$, being respectively equal to the reciprocals of $G_{mr}$, $G_{mb}$, and $G_{mn}$, can be obtained directly from these equations. For example, $$R_{mr} = \frac{1}{G_{mr}} = \frac{1}{m_{mr}}\left(\frac{E_0}{D_0} \cdot \frac{D_S}{I_S}\right) \quad (13)$$

By applying the same procedure, the values of $R_{mb}$ and $R_{mn}$ will be found to be respectively equal to the reciprocals of $m_{mb}$ and $m_{mn}$ multiplied in each case by the parenthetical constant factor in Equation 13. It is therefore clear that each of the resistive elements connected to milliammeters $A_c$, $A_m$, and $A_y$ in FIG. 1 is equally proportioned with respect to the corresponding ones of the given "*m*" multiples, more specifically being inversely proportional thereto. In this connection note that the value of $m_{cb}$ in the first of Equations 3*a* is zero, the corresponding term being absent from the first Equation 3. Consequently, $G_{cb}$ is zero and $R_{cb}$ is infinite (open-circuit). No actual resistor corresponding to $R_{cb}$ is therefore included in FIG. 1.

Assuming that the resistor $R_L$ has a much larger resistance than milliammeter $A_L$ and voltage-divider 28, the current $I_L$ through milliammeter $A_L$ will be $$I_L = \frac{E_n - E_N}{R_L} = \frac{1}{R_L} \cdot \frac{E_0}{D_0}(D_n - 0.04N) = \frac{1}{R_L} \cdot \frac{E_0}{D_0} D_L \quad (14)$$

as obtained by Equations 6, 6*a*, and 4. If the full-scale current of milliammeter $A_L$ is $I_S$, and is to represent a neutral density $D_{LS}$, the value of $R_L$ will be (from Equation 14)

$$R_L = \frac{E_0}{D_0} \cdot \frac{D_{LS}}{I_S} \quad (15)$$

*Error Reduction and Final Calculations*

Turning now to some practical considerations involved in the construction of the circuit of FIG. 1, milliammeters of suitable range $I_S$ are available having resistances which are negligibly small compared with the resistances connected thereto. However, to use correspondingly small resistances for voltage-dividers 1, 3, 5, and 7 would be wasteful of power. To maintain reasonable circuit efficiency, the various steps of the switches comprised in those voltage-dividers, as described above, must therefore have resistances which while still relatively small cannot be ignored in determining the actual voltages produced at voltage-divider output taps 9, 11, and 13. The assumption that the voltage-divider resistances are negligible relative to the fixed resistances connected to the milliammeters is therefore not entirely accurate, necessitating correction of Equations 7, 10, 11, 12, and 13.

Considering the current $I_m$ through milliammeter $A_m$, the requisite correction may be derived by noting that $E_g$ is actually the open-circuit voltage to ground existing at tap 11 of voltage-divider 3. If the total resistance to ground looking back from that point is $R_e$, the equivalent circuit (by Thévenin's theorem) looking back is a voltage source $E_g$ in series with a resistance $R_e$. The actual voltage applied to milliammeter $A_m$ is therefore $E_g - I_mR_e$, rather than just $E_g$ as assumed. By substituting this quantity for $E_g$ in Equation 7, and solving for $I_m$, the result will be an equation of the same form except that $I_m$ is replaced by $I_m(1 + G_{mg}R_e)$.

Accordingly, a correction factor $(1 + G_{mg}R_e)$ must be applied to $I_m$ and $I_S$ in Equations 10, 11, and 12. Application of the same correction to $I_S$ in Equation 13 gives a corrected value $R_{mr}$, as follows:

$$R_{mr} = \frac{1}{m_{mr}}\left(\frac{E_0}{D_0} \cdot \frac{D_S}{I_S} - m_{mg}R_e\right) \quad (16)$$

The parenthetical factor in Equation 16 also applies to $R_{mb}$ and $R_{mn}$, and corresponding factors apply to the resistances associated with milliammeters $A_c$ and $A_y$.

If the value of $R_e$ remained constant regardless of the setting of any of voltage-dividers 1, 3, and 5, the computed values of the resistors connected to each of milliammeters $A_c$, $A_m$, and $A_y$ would achieve perfect simulation of Equations 3*a* which the computer is designed to solve. Actually, $R_e$ for each voltage-divider depends on the tap setting thereof, varying from a minimum value of zero to a maximum value of one-quarter of the total resistance to ground through each voltage-divider. The variation of $R_e$ with tap setting is important only at high milliammeter readings, which occur when the corresponding specified density is high, and is then reduced by the fixed series resistors 17, 19, or 21, which keep $R_e$ from falling below the value of 1.8 kilohms (2.2 in parallel with 10.8 kilohms). The highest value that $R_e$ can have is one-quarter of the total resistance of (10.8+2.2), or 3.25 kilohms, giving a weighted average of about 2.5 kilohms. Deviations from this average value will produce errors of less than 0.5 percent, or 0.00375 in density, if the full scale of the milliammeter represents a density of 0.75. This error is much less than the smallest available step in filter density and so is quite tolerable.

It may be noted that errors may also occur in the measured value of $I_m$, and similarly in the other milliammeter currents, due to the flow of such current through the $R_e$ resistances of the voltage-dividers other than that corresponding to the milliammeter in question. However, such cross-errors will normally be found to be quite tolerable. It should also be noted that no correction need be applied for the resistance of voltage-divider 7, because the voltage $E_n$ used in the derivations is the actual voltage at tap 15 thereof, unlike the voltages $E_r$, $E_g$, and $E_b$ which were calculated in Equations 5 on the assumption that no appreciable currents are drawn off at the respective taps 9, 11, and 13.

In equations in the form of that of Equation 16 suitable values of $I_S$ and $D_S$ may be taken as 0.5 milliampere and 0.75 density, respectively. If $E_0$ is 124.6 volts and $D_0$ is 1.5, as given previously, $$\frac{E_0}{D_0}\cdot\frac{D_S}{I_S}=\frac{124.6}{1.50}\cdot\frac{0.75}{0.5}=124.6 \text{ kilohms}$$

Since terms of the form $m_{mg}R_e$ are relatively small, it will be satisfactory to use a single average value for $m_{mg}$, $m_{cr}$, and $m_{yb}$ which, by Equations 3 above, may be taken as 1.15. Using an average value of $R_e$ of 2.5 kilohms, the values of $m_{mg}R_e$, $m_{cr}R_e$, and $m_{yb}R_e$ may thus be taken as 2.9 kilohms. The value of the parenthetical factor in Equation 16 is then 124.6−2.9=121.7 kilohms. Using the "*m*" multiples in Equations 3, the requisite resistance values may be calculated from equations in the form of that of Equations 16. The resultant resistances in kilohms, as so calculated, are as follows:

| | | |
|---|---|---|
| $R_{cg}=\frac{121.7}{0.04}=3{,}000$ | $R_{mr}=\frac{121.7}{0.24}=510$ | $R_{yr}=\frac{121.7}{0.07}=1{,}700$ |
| $R_{cb}=\frac{121.7}{0}=\infty$ | $R_{mb}=\frac{121.7}{0.07}=1{,}700$ | $R_{yg}=\frac{121.7}{0.18}=680$ |
| $R_{cn}=\frac{121.7}{1.10}=110$ | $R_{mn}=\frac{121.7}{0.89}=137$ | $R_{yn}=\frac{121.7}{0.85}=143$ |

Equation 15 for $R_L$ also requires a correction for the resistance $R'_e$ looking back from the tap 29 of voltage-divider $S_N$. This is because $R'_e$ is in series with $R_L$ and so must be subtracted from the value of $R_L$ determined by Equation 15, giving for the corrected value, $$R_L=\frac{E_0}{D_0}\cdot\frac{D_{LS}}{I_S}-R'_e \qquad (17)$$

The range $I_S$ of milliammeter $A_L$ may also be taken as 0.5 milliamperes, but the neutral density range $D_{LS}$ should exceed the value 0.75 for $D_S$ of the other milliammeters and may be taken as 1.50. Then $$\frac{E_0}{D_0}\cdot\frac{D_{LS}}{I_S}=\frac{124.6}{1.50}\cdot\frac{1.50}{0.5}=249 \text{ kilohms}$$

The value of $R'_e$ depends on the position of tap 29 and lies between 0 and 1.8 kilohms. Taking a weighted average value of 1 kilohm, Equation 17 gives $$R_L=249-1=248 \text{ kilohms}$$

The variations in $R'_e$ will then introduce an error in the measured density $D_L$ which is less than the smallest step of 0.025 in density.

*Operation of the Circuit of FIG. 1*

In employing a computer constructed as in FIG. 1, the taps 9, 11, and 13 of red, green, and blue voltage-dividers 1, 3, and 5 are first respectively set in accordance with the specified values of red density $D_r$, green density $D_g$, and blue density $D_b$. Such adjustment may conveniently be effected simply by ganging the switches of those voltage-dividers to the red, green, and blue attenuator controls of an electronic previewer having proportionate voltage attenuation steps as described above. The resultant readings of the milliammeters $A_c$, $A_m$, and $A_y$ are then observed, and tap 15 of voltage-divider 7 is adjusted until the reading of one of them is reduced to zero, the other two readings not being negative. The readings of the remaining two milliammeters then indicate the total required densities of sets of color-correction filters for the corresponding complementary colors. For example, if the reading of milliammeter $A_c$ is reduced to zero, the readings of milliammeters $A_m$ and $A_y$ will respectively indicate the total required densities of the sets of magenta and yellow color-compensating filters. Then, specific sets of standard color-correction filters having total nominal densities as close as possible to the indicated required values of M and Y must be selected. Having made such selection, preferably involving choosing the least possible number of such standard filters, the total number N thereof is the proper step setting of tap 29 of switch $S_N$ in FIG. 1. The required neutral density $D_L$ to be supplied by a set of neutral filters is then indicated by milliammeter $A_L$. To facilitate this procedure all milliammeters are preferably calibrated to read density directly.

*Milliammeter Scale Calibration*

If milliammeters $A_c$, $A_m$, and $A_y$ were provided with scales simply giving the numerical values of the total required densities C, M, and Y, it would still be necessary for the operator of the computer to determine the least number of standard color-correction filters of each type having density ratings totalling the required value in each case. To avoid this inconvenience, and to insure a definite combination employing the least number of filters, it is therefore desirable that each of those instruments has a scale which directly indicates the requisite filter combination. Such a scale is illustrated in FIG. 2 for the binary submultiple rated filter densities 0.025 and 0.05 and the successive integral multiple rated filter densities 0.10, 0.20, 0.30, 0.40, and 0.50, the reference density value being 0.10. It comprises three adjacent coextensive parallel strips A, B, and C, each strip being divided into successive equal divisions and all starting from a negative displacement of index P corresponding to one-half of the smallest available submultiple density 0.025. That is, the left edge of the scale starts sufficiently to the left of the "0" position of index P so that that position falls at the center of the first division of outermost strip A. Strips A and B respectively indicate the rated binary submultiple density values, and so may be denoted "subsidiary" strips. Strip C indicates the rated integral multiple density values, and so may be denoted a "principal" strip. Of course, while a specific set of rated filter densities has been illustrated, the kind of arrangement described is applicable to any set of ordered rated filter values. The widths of the divisions of subsidiary strip A are proportional to the submultiple density value indicated by that strip, namely 0.025, while the widths of the divisions of subsidiary strip B are proportional to the other submultiple density value 0.05. Successive divisions of each of these strips are marked alternately inactive and active starting with an inactive division. Such marking may be conveniently effected, as shown, by coloring or blacking in the active divisions.

The widths of the divisions of principal strip C are proportional to the reference density 0.10, successive ones thereof after the first division being marked in terms of successive ones of the rated integral multiple densities. The first division indicates zero density, being unmarked.

Since the available integral multiple densities values extend only up to 0.50, the foregoing division markings of strip C are carried on only up to and including that value. Then, divisions subsequent to the maximum integral multiple density division simply repeat the marking thereof. A second principal parallel strip D is therefore provided to permit indication of density values greater than 0.50 up to and including the full-scale deflection density of 0.75. Strip D is the same as strip C, having divisions of the same width, but starts at the end of the foregoing maximum integral multiple density division of strip C. Successive divisions of strip D are marked with successive ones of the integral multiple densities, here ending with the 0.20 density because the full-scale deflection represents a total density of only 0.75 which falls in that division. Actually, that division and the radially adjacent divisions of the other strips extend beyond the actual full-scale density value of 0.75 up to a value 0.75+0.0125. However, this is preferable to cutting off half of the last .025 division of strip A and the corresponding remainders of the other strips.

With the foregoing scale, when index P is displaced in accordance with any given total density, the active divisions of subsidiary strips A and B and the marked divisions of principal strips C and D at such displacement will indicate directly the least number of individual rated filter densities having a sum as close as possible to the required total density value. That is, those filters will provide a total density equal to the required value within a tolerance of one-half the smallest submultiple density value of .025, representing a maximum error of only .0125 in density. For example, at the index displacement illustrated in FIG. 2, the division of subsidiary strip A is active. A filter of density .025 is therefore required. The division of subsidiary strip B is inactive, so that no filter of density 0.05 is required. Finally, the markings of the divisions of principal strips C and D respectively call for filters of rated densities 0.50 and 0.10. Thus, the required total density is provided by three filters of rated densities 0.025, 0.50, and 0.10, the total being 0.625. The value of N for setting tap 29 of switch $S_N$ in FIG. 1 is therefore 3, so that it would be set at its contact number 3.

The scale in FIG. 3 is constructed in accordance with the same principles as that in FIG. 2, but is applicable to an instrument which measures neutral filter density rather than color-correction filter density. That is, the scale in FIG. 2 may be used for milliammeters $A_c$, $A_m$, and $A_y$ in FIG. 1, while the scale in FIG. 3 is applicable to milliammeter $A_L$. The latter will then indicate the least number of standard neutral filters having a total density equal to that measured by the displacement of its index L. The difference between the two scales is due to the fact that a total neutral density of 1.5 may be necessary, as against a maximum required color-correction filter density of 0.75; and further because conventional photographic printing practice employs a neutral density of 0.75 as the norm, other neutral densities being represented in terms of deviations from that value. Accordingly, the scale in FIG. 3 comprises a first set of strips A, B, C, and D as in FIG. 2, this set extending to the right in the direction of positive displacement of index L from a "0" index position in the center of the scale. A second set of strips A′, B′, C′, and D′ extends to the left of center in the direction of negative displacement from the "0" index position. This second set of strips is a mirror image of the first set, so that the first divisions of strips A, B, and C are respectively shared in common with strips A′, B′, and C′, the "0" index position lying in the center of the first division of each of those strips. Accordingly, index displacements to the left of center indicate neutral densities to be subtracted from the norm of 0.75, and deflections to the right of center indicate neutral densities to be added thereto. At the illustrated index position two filters of rated densities 0.025 and 0.5 are required, giving a total neutral density of 0.525 in addition to the reference neutral density. The actual total neutral density will therefore be 0.525+0.75=1.275. Since neutral filters of densities 0.6 and 0.7 are available, principal strips D and D′ in FIG. 3 could be omitted in favor of simply marking the last two divisions of each of principal strips C and C′ 0.6 and 0.7 instead of 0.5. It should also be noted that in some cases supplementary techniques are employed to control the neutral intensity of the resultant light produced in subtractive colorimetric processes, so that modified versions of the scale shown in FIG. 3 may be required. This will not affect the described operation of the computer of FIG. 1, since the number of neutral filters does not enter into the colorimetric equations as does the number N of color-correction filters which are employed.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. For use in a subtractive colorimetric process, a computer for determining the required densities of a neutral filter and sets of color-correction filters having colors respectively complementary to respective ones of a set of primary color components for which said filters are together required to provide respective arbitrarily specified densities, each required density being equal to a given multiple of the specified density for the complementary color component reduced by the sum of given multiples of the specified densities for the remaining color components and a given multiple of a selectable total neutral density, said selectable total neutral density being equal to the sum of said neutral filter density plus a given multiple of the total number of color-correction filters in all of said sets, said computer comprising: a plurality of means for providing voltages respectively adjustable in proportion to respective ones of said specified densities; additional means for providing an auxiliary adjustable voltage to which said selectable total neutral density is proportional; a plurality of principal current-responsive indicating means for respectively displaying said required color-correction filter densities, each of said principal indicating means having a pair of terminals of which one is connected to the voltage-adjusting means for the specified density for the color component complementary to the required density to be displayed; a plurality of resistive elements for respectively connecting the remaining terminal of each of said indicating means to the remaining ones of said voltage-adjusting means, each of said resistive elements having a resistance inversely proportional to the one of said given multiples which is applicable to the relation between the density represented by the voltage-adjusting means to which it is connected and the required density to be indicated by the indicating means to which it is further connected; auxiliary current-responsive indicating means for displaying said required neutral filter density, said auxiliary indicating means also having a pair of terminals of which one is connected to said auxiliary voltage-adjusting means; and means for applying to the remaining terminal of said auxiliary indicating means a voltage which is variable in steps proportional to the total number of color-correction filters in all of said sets; whereby the current through said auxiliary indicating means is proportional to said required neutral filter density and the current through each of said principal indicating means is proportional to the required color-correction filter density to be displayed thereby.

2. For use in a subtractive colorimetric process, a computer for determining the required densities of a neutral filter and sets of color-correction filters having colors respectively complementary to respective ones of a set of primary color components for which said filters are together required to provide respective arbitrarily specified densities, each required density being equal to a given multiple of the specified density for the complementary color component reduced by the sum of given multiples of the specified densities for the remaining color component and a given multiple of a selectable total neutral density, said selectable total neutral density being equal to the sum of said neutral filter density plus a given mulitple of the total number of color-correction filters in all of said sets, said computer comprising: a plurality of means for providing voltages respectively adjustable in the same proportion to respective ones of said specified densities; additional means for providing an auxiliary adjustable voltage to which said selectable total neutral density bears said same proportion; a plurality of principal current-responsive indicating means for respectively displaying said required color-correction filter densities, each of said principal indicating means having a pair of terminals of which one is connected to the voltage-adjusting means for the specified density for the color component complementary to the required density to be displayed; a plurality of resistive elements for respectively connecting the remaining terminal of each of said indicating means to the remaining ones of said voltage-adjusting means, each of said resistive elements having a resistance inversely proportional to the one of said given multiples which is applicable to the relation between the density represented by the voltage-adjusting means to which it is connected and the required density to be indicated by the indicating means to which it is further connected, said proportioning being the same for all said resistive elements relative to the corresponding ones of said given multiples; auxiliary current-responsive indicating means of relatively low resistance for displaying said required neutral filter density, said auxiliary indicating means also having a pair of terminals of which one is connected to said auxiliary voltage-adjusting means; and stepped voltage-dividing means of relatively low resistance for applying to the remaining terminal of said auxiliary indicating means a voltage which is variable in steps, the number of steps being equal to the total number of color-correction filters used in all of said sets; whereby the current through said auxiliary indicating means is proportional to said required neutral filter density and the current through each of said principal indicating means is proportional to the required color-correction filter density to be displayed thereby.

References Cited in the file of this patent

UNITED STATES PATENTS 2,886,780 Schauffer ---------------- May 12, 1959

OTHER REFERENCES

Fritz: Review of Scientific Instruments, vol. 23, number 12, pages 667–671, December 1952.